W. F. MARCH.
BRAKE ADJUSTER FOR AUTOMOBILES, TRUCKS, AND THE LIKE.
APPLICATION FILED AUG. 11, 1919. RENEWED JAN. 21, 1922.
1,427,113.
Patented Aug. 29, 1922.
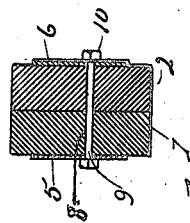
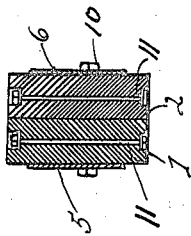
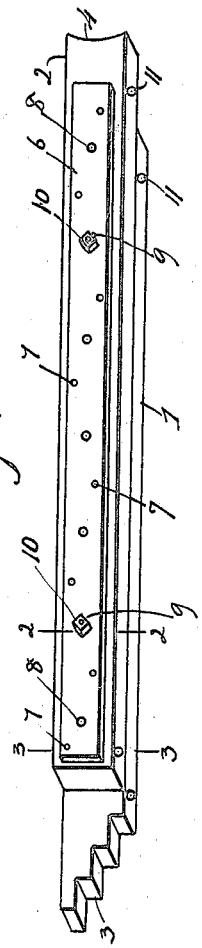
Inventor
William Frank March

UNITED STATES PATENT OFFICE.

WILLIAM FRANK MARCH, OF PHILADELPHIA, PENNSYLVANIA.

BRAKE ADJUSTER FOR AUTOMOBILES, TRUCKS, AND THE LIKE.

1,427,113.     Specification of Letters Patent.    Patented Aug. 29, 1922.

Application filed August 11, 1919, Serial No. 316,758. Renewed January 21, 1922. Serial No. 530,999.

*To all whom it may concern:*

Be it known that I, WILLIAM FRANK MARCH, a citizen of the United States, residing at Philadelphia, in the county of Philadelphia and State of Pennsylvania, have invented new and useful Improvements in Brake Adjusters for Automobiles, Trucks, and the like, of which the following is a specification.

My invention relates to a new and useful improvement in brake adjusters for automobiles, trucks and the like, and has for its object to provide an exceedingly simple and effective device which may be readily applied to the operating lever of a brake so as to hold said lever in proper position while the brake bands are being adjusted thus enabling equalizing of these brake bands so that they will take proper hold in unison when the brake lever is operated by the driver of the machine.

With this end in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a perspective view of my improved adjuster.

Fig. 2, is a section at the line 2—2 of Fig. 1, and

Fig. 3, is a section at the line 3—3 of Fig. 1.

In carrying out my invention as here embodied, I provide two bars 1 and 2 the former having steps 3 formed upon one end thereof so as to enter into engagement with the foot brake lever of an automobile and provide for a limited amount of adjustment of said lever by engaging one or the other of the series of steps. The bar 2 has its outer end curved as indicated at 4 in order that it may readily enter into engagement with the front seat board of the automobile. These bars are preferably made of wood and have the metal plates 5 and 6 secured against their outer surfaces by screws 7.

8 represents holes which pass through the metal plates and bars for the reception of the clamping bolts 9 here shown as two in number each bolt having a nut 10 run thereon for clamping the parts together. By this arrangement the bars may be adjusted relative to each other so as to make the total length of the device greater or less as occasion may require.

11 represents stay bolts which are passed through each of the bars to prevent the splitting of said bars when under strain.

To use this adjusting device it is only necessary to engage the curved portion 4 of the bar 2 with the front seat board of the automobile and then bring one of the steps 3 into contact with the foot brake lever or pedal after said lever has been pressed forward to the position it should assume when the brake bands are properly applied to the brakes, and the proper length for the adjuster for accomplishing this result is provided by placing the post 9 in the holes 8 which correspond to the length desired as will be readily understood.

When the brake lever has been set as above described the brake bands may be then adjusted and equalized so that they will take hold upon the brake drums or discs simultaneously so that thereafter the operation of the brake lever will apply both brakes in unison.

Heretofore it has required the services of two persons to equalize and adjust the brake bands of an automobile, one to hold the brake lever while the other adjusted the bands and accuracy of an adjustment was seldom accomplished, but by the use of my improvement the brake lever is held positively and in a predetermined position so that a single person may adjust the brake bands with greater accuracy than has heretofore been possible saving much time, labor and chance for accident.

Of course I do not wish to be limited to the exact details of construction as herein shown as these may be varied within the limits of the appended claims without departing from the spirit of my invention.

Having thus fully described my invention, what I claim as new and useful is:—

1. As a new article of manufacture a brake band adjuster for automobiles consisting of two members adjustable upon each other one of said members having steps formed upon the end thereof the other member having a curved end.

2. In a device of the character described, the combination of two bars having a series of holes formed therethrough, bolts adapted to pass through said holes and screw said bars together in various adjustments, and a plate secured to the outer surface of each of the bars there being steps formed upon one end of one of the bars for engagement with a brake lever.

In testimony whereof, I have hereunto affixed my signature.

W. FRANK MARCH.